US010889713B2

(12) United States Patent
Schubert et al.

(10) Patent No.: US 10,889,713 B2
(45) Date of Patent: Jan. 12, 2021

(54) POLYAMIDE MOULDING COMPOUND AND MOULDED ARTICLES PRODUCED THEREFROM

(71) Applicant: EMS-PATENT AG, Domat/Ems (CH)

(72) Inventors: Christian Schubert, Domat/Ems (CH); Botho Hoffmann, Domat/Ems (CH); Andreas Bayer, Domat/Ems (CH)

(73) Assignee: EMS-Patent AG, Domat/Ems (CH)

( * ) Notice: Subject to any disclaimer, the term of this patent is extended or adjusted under 35 U.S.C. 154(b) by 16 days.

(21) Appl. No.: 15/955,737

(22) Filed: Apr. 18, 2018

(65) Prior Publication Data

US 2018/0298191 A1 Oct. 18, 2018

(30) Foreign Application Priority Data

Apr. 18, 2017 (EP) .................................... 17166917

(51) Int. Cl.
| | |
|---|---|
| C08L 77/06 | (2006.01) |
| C08G 69/26 | (2006.01) |
| B32B 5/08 | (2006.01) |
| C08G 69/36 | (2006.01) |
| C08J 5/04 | (2006.01) |
| C08L 77/02 | (2006.01) |

(52) U.S. Cl.
CPC ............... *C08L 77/06* (2013.01); *B32B 5/08* (2013.01); *C08G 69/265* (2013.01); *C08G 69/36* (2013.01); *C08J 5/04* (2013.01); *C08J 5/042* (2013.01); *C08J 5/043* (2013.01); *C08L 77/02* (2013.01); *C08J 2377/02* (2013.01); *C08J 2377/06* (2013.01); *C08J 2477/06* (2013.01); *C08L 2205/025* (2013.01); *C08L 2205/03* (2013.01); *C08L 2205/06* (2013.01)

(58) Field of Classification Search
None
See application file for complete search history.

(56) References Cited

U.S. PATENT DOCUMENTS

| | | | |
|---|---|---|---|
| 8,022,170 | B2 | 9/2011 | Hoffman et al. |
| 8,383,244 | B2 | 2/2013 | Bayer et al. |
| 8,604,120 | B2 | 12/2013 | Stoppelmann et al. |
| 9,133,322 | B2 | 9/2015 | Roth et al. |
| 9,644,081 | B2 | 5/2017 | Aepli et al. |
| 9,963,591 | B2 | 5/2018 | Bayer et al. |
| 2004/0087735 | A1 | 5/2004 | Nozaki et al. |
| 2006/0235190 | A1 | 10/2006 | Hoffman et al. |
| 2012/0029133 | A1 | 2/2012 | Stöppelmann et al. |
| 2012/0321829 | A1 | 12/2012 | Bayer et al. |
| 2014/0094548 | A1 | 4/2014 | Roth et al. |
| 2014/0171573 | A1 | 6/2014 | Bayer et al. |
| 2015/0126635 | A1 | 5/2015 | Liedloff et al. |
| 2015/0218374 | A1 | 8/2015 | Thomas et al. |
| 2015/0284531 | A1 | 10/2015 | Aepli et al. |
| 2015/0352765 | A1 | 12/2015 | Hoffmann et al. |
| 2016/0130439 | A1 | 5/2016 | Koch et al. |
| 2016/0152770 | A1 | 6/2016 | Richter et al. |
| 2016/0280914 | A1 | 9/2016 | Thomas et al. |
| 2017/0107326 | A1 | 4/2017 | Bayer et al. |
| 2018/0100064 | A1 | 4/2018 | Aepli et al. |

FOREIGN PATENT DOCUMENTS

| | | |
|---|---|---|
| DE | 2 256 214 A1 | 5/1974 |
| EP | 0 280 736 A1 | 9/1988 |
| EP | 2 727 951 A1 | 5/2014 |
| EP | 2 767 555 A1 | 8/2014 |
| JP | 2010-285553 A | 12/2010 |
| WO | WO 2014/198762 A1 | 12/2014 |
| WO | WO 2016/208272 A1 | 12/2016 |

OTHER PUBLICATIONS

European Patent Office, Extended European Search Report issued in European Patent Application No. 17 16 6917.9 (dated Jul. 11, 2017).
U.S. Appl. No. 10/536,494, filed Oct. 5, 2006.
U.S. Appl. No. 10/553,259, filed Jul. 24, 2006.
U.S. Appl. No. 11/950,964, filed Dec. 5, 2007.
U.S. Appl. No. 12/743,097, filed May 14, 2010.
U.S. Appl. No. 13/045,682, filed Mar. 11, 2011.
U.S. Appl. No. 13/186,785, filed Jul. 20, 2011.
U.S. Appl. No. 13/421,541, filed Mar. 15, 2012.
U.S. Appl. No. 13/481,451, filed May 25, 2012.
U.S. Appl. No. 13/800,102, filed Mar. 13, 2013.
U.S. Appl. No. 13/898,099, filed May 20, 2013.
U.S. Appl. No. 13/971,376, filed Aug. 20, 2013.
U.S. Appl. No. 14/205,667, filed Mar. 12, 2014.
U.S. Appl. No. 14/397,529, filed Oct. 28, 2014.
U.S. Appl. No. 14/397,534, filed Oct. 28, 2014.
U.S. Appl. No. 14/607,676, filed Jan. 28, 2015.
U.S. Appl. No. 14/663,105, filed Mar. 19, 2015.
U.S. Appl. No. 14/681,669, filed Apr. 8, 2015.
U.S. Appl. No. 14/729,277, filed Jun. 3, 2015.
U.S. Appl. No. 14/740,736, filed Jun. 16, 2015.
U.S. Appl. No. 14/935,642, filed Nov. 9, 2015.
U.S. Appl. No. 14/915,031, filed Feb. 26, 2016.
U.S. Appl. No. 15/090,881, filed Apr. 5, 2016.
U.S. Appl. No. 15/105,011, filed Sep. 6, 2016.
U.S. Appl. No. 15/253,506, filed Aug. 31, 2016.
U.S. Appl. No. 15/285,947, filed Oct. 5, 2016.
U.S. Appl. No. 15/349,636, filed Nov. 11, 2016.
U.S. Appl. No. 15/349,729, filed Nov. 11, 2016.

(Continued)

*Primary Examiner* — Ana L. Woodward
(74) *Attorney, Agent, or Firm* — Leydig, Voit & Mayer, Ltd.

(57) ABSTRACT

Disclosed is a polyamide moulding compound formed from a mixture of partially crystalline, aliphatic polyamides and partially crystalline, partially aromatic polyamides and also fibrous reinforcing materials. The partially crystalline, partially aromatic polyamides are thereby formed from a diamine component, a dicarboxylic acid component and possibly a lactam- and/or ω-amino acid component. The mixture and/or the moulding compound can include further components. Moulded articles produced from these moulding compounds are used, for example, in the automobile sphere, in the household sphere, in measuring, regulating and control technology or in mechanical engineering.

15 Claims, No Drawings

(56) References Cited

OTHER PUBLICATIONS

U.S. Appl. No. 15/385,432, filed Dec. 20, 2016.
U.S. Appl. No. 15/546,373, field Jul. 26, 2017.
U.S. Appl. No. 15/729,321, filed Oct. 10, 2017.
U.S. Appl. No. 15/789,069, filed Oct. 20, 2017.
U.S. Appl. No. 15/826,177, filed Nov. 29, 2017.

POLYAMIDE MOULDING COMPOUND AND MOULDED ARTICLES PRODUCED THEREFROM

CROSS-REFERENCE TO A RELATED APPLICATION

This patent application claims the benefit of European Patent Application No. 17 166 917.9, filed on Apr. 18, 2017, the disclosure of which is incorporated herein by reference in its entirety for all purposes.

BACKGROUND OF THE INVENTION

The invention relates to a polyamide moulding compound which comprises a mixture of partially crystalline, aliphatic polyamides and partially crystalline, partially aromatic polyamides and also fibrous reinforcing materials or is formed therefrom. The partially crystalline, partially aromatic polyamides are thereby formed from a diamine component, a dicarboxylic acid component and possibly a lactam- and/or co-amino acid component. The mixture and/or the moulding compound can comprise further components. Moulded articles produced from these moulding compounds are used, for example, in the automobile sphere, in the household sphere, in measuring, regulating and control technology or in mechanical engineering.

Thermoplastic partially aromatic polyamides which can be amorphous or partially crystalline represent a group of polyamides which are distinguished by their high glass transition temperature or melting temperature, which however, in general, impairs processing of these polyamides. These polyamides can be used in various fields in the case of high-temperature applications. Of particular importance thereby is good heat ageing- or thermostability and high strength or transparency.

EP 2 727 951 A1 and also EP 2 767 555 A1 describe amorphous copolyamides based on aromatic dicarboxylic acids and cycloaliphatic diamines and further monomers as material for portable electronic devices. The aliphatic diamine used as further monomer is decanediamine. Further polymers such as e.g. PA66 can optionally be contained, however only up to a concentration of at most 30% by weight. No polymer mixtures are processed. In addition, these purely amorphous copolyamides are not able to improve the thermomechanical properties of aliphatic polyamides.

Also EP 0 280 736 A1 likewise describes extensively amorphous copolyamides based on the diamines, hexanediamine (HMDA) and bis(aminomethyl)cyclohexane (BAC) or bis(4-amino-3-methyl cyclohexyl)methane (MACM) and the dicarboxylic acids, terephthalic acid (TPS) and isophthalic acid (IPS). Blends are now mentioned entirely generally. Also DE 2 256 214 describes similar compositions. It is the aim to provide improved transparent polyamides. Blends with other polyamides are not mentioned.

WO 2016/208272A1 describes transparent copolyamides, the diamine component of which is based at least up to 70% by mol on BAC. Blends with aliphatic polyamides are mentioned only briefly.

WO 2014/198762 describes partially aromatic copolyamides based on a mixture of linearly aliphatic and cycloaliphatic diamines. Exclusively the cycloaliphatic diamines isophoronediamine, MACM and methylene-bis-4-(cyclohexylamine) (PACM), but not BAC, are processed, in addition all examples comprise isophthalic acid and are free of aliphatic dicarboxylic acids. Blends are neither processed nor mentioned.

Whilst the known amorphous moulding compounds of the above-mentioned state of the art have disadvantages in thermostability and low rigidity, in particular at increased temperature and in a humid environment, high-melting partially crystalline, partially aromatic polyamides require very high production-, processing- and mould temperatures, which makes processing difficult and expensive. In addition, these moulding compounds are often very brittle, have a low breaking elongation and frequently crystallise inadequately. In contrast thereto, aliphatic polyamides can be processed significantly better, are less brittle and have a higher breaking elongation. However, for demanding applications they often lack the required rigidity, in particular in a warm, humid environment, not least because of the too high water absorption. Hence, the known polyamide moulding compounds are associated with disadvantages with respect to their thermomechanical properties and/or processibility.

It is therefore the object of the present invention to indicate a moulding compound based on polyamides, which does not have the previously mentioned disadvantages and has a correspondingly advantageous property profile. In particular, it is the object of the present invention to provide moulding compounds which are similar to the aliphatic polyamides, with respect to production and processing, and do not require extreme compound- and mould temperatures, as is the case in particular with partially aromatic, partially crystalline polyamides.

Furthermore, it is the object to provide moulding compounds which have high rigidity even at fairly high temperatures up to 100° C. and in a humid environment.

Furthermore it is the aim of the present invention to provide polyamide moulding compounds which are distinguished, in addition to high breaking stress and breaking elongation (at 23° C.), also by high thermostability, measured as HDT/A and HDT/C.

In addition, the moulding compounds should have low water absorption, in particular compared with short-chain aliphatic polyamides.

This object is achieved by the features of the polyamide moulding compound and the moulded article described herein. Also disclosed are advantageous developments thereof.

According to the invention, a polyamide moulding compound is hence presented, which comprises the following components (I) to (VI) or consists hereof:

(I) 30 to 100% by weight of a mixture made of
  (A) 52 to 88% by weight of at least one partially crystalline, aliphatic polyamide; and also
  (B) 12 to 48% by weight of at least one partially crystalline, partially aromatic polyamide, formed from a diamine component (Ba), a dicarboxylic acid component (Bb) and possibly a lactam- and/or co-amino acid component (Bc), the diamine component (Ba) being used essentially equimolar to the dicarboxylic acid component (Bb), the quantity of lactam- and/or co-amino acid component (Bc) being 0 to 15% by mol and the sum of components (Ba) to (Bc) being 100% by mol and the
  diamine component (Ba) consisting of
  (Ba1) 62 to 96 mol-parts of 1,6-hexanediamine,
  (Ba2) 4 to 38 mol-parts of bis(aminomethyl) cyclohexane, and also
  (Ba3) 0 to 30 mol-parts of one or more cycloaliphatic diamines, different from (Ba2), the sum of (Ba2) and (Ba3) being 4 to 38 mol-parts and the sum of (Ba1), (Ba2) and (Ba3) being 100 mol-parts, dicarboxylic acid component (Bb) consisting of (Bb1) 64 to 100 mol-parts of terephthalic acid,
(Bb2) 0 to 18 mol-parts of isophthalic acid and also
(Bb3) 0 to 18 mol-parts of one or more aliphatic dicarboxylic acids with 6 to 18 C atoms, the sum of (Bb1), (Bb2) and (Bb3) being 100 mol-parts, and the lactam- and/or ω-amino acid component (Bc) consisting of one or more lactams and/or ω-amino acids, the sum of the lactams and/or ω-amino acids being 100 mol-parts, the proportions of (A) and (B) being related to the sum of the used polyamides (A) and (B) and constituting in total 100% by weight, (II) 0-70% by weight of fibrous reinforcing materials;
(III) 0-30% by weight of particulate fillers, different from (II), (IV) to (VI);
(IV) 0-20% by weight of impact modifiers;
(V) 0-2.0% by weight of heat stabilisers;
(VI) 0-6% by weight of auxiliary materials and/or additives, different from (II)-(V);

the sum of components (I)-(VI) constituting 100% by weight of the polyamide moulding compound.

The present invention hence relates to a polyamide moulding compound which comprises a mixture of two different polyamides or consists hereof, the mixture comprising at least one partially crystalline, aliphatic polyamide (A) and a partially crystalline, partially aromatic polyamide (B) or being formed therefrom.

The mixture can possibly comprise one or more further components (II) to (VI), the weight sum of the polyamide moulding compound being calculated on the basis of components (I) to (VI) in the above-indicated content thereof; the weight sum is always 100% by weight.

It is likewise possible that the polyamide moulding compound is formed, up to 100% by weight, from the mixture of polyamides (A) and (B) and hence comprises no further components.

Surprisingly, it could be established that, with the polyamide moulding compounds according to the invention, a production and processing is possible under the same conditions as with aliphatic polyamides. Thus, in comparison with the partially aromatic, partially crystalline polyamides, 40-60° C. lower cylinder temperatures are required during compounding of the moulding compounds according to the invention, as a result of which a lower material requirement is involved and the production can take place with energy saving.

Also the processing, in particular in injection moulding, can be effected analogously to the production with a significantly lower compound temperature and possibly lower mould temperatures. For example, the compound temperature, in comparison with partially aromatic, partially crystalline polyamides, can be reduced with a moulding compound, based on PA66, from 340 to 310° C. The conditions required for processing high-temperature polyamides can hence be avoided.

In addition, it was established that moulded articles produced from the moulding compounds according to the invention have a high degree of rigidity, even at higher temperatures, i.e. up to 100° C. in the dry and conditioned state. The modulus of elasticity in tension decreases less abruptly with increasing temperature than in the case of aliphatic polyamides or in the known blends of the state of the art. At the same time, the strength (breaking stress) and the breaking elongation are maintained extensively at 23° C.

In addition, higher values for the thermostability (HDT/A and HDT/C) can be achieved with the moulding compounds according to the invention.

Also the water absorption can be significantly reduced with the polyamide moulding compounds according to the invention, in particular this effect is positively crucial if short-chain aliphatic polyamides (A) are contained in the polyamide moulding compound.

The subsequent explanations relate to preferred embodiments of the invention.

Component (I)

The mixture of the two previously mentioned polyamides (A) and (B) (=component (I)) comprises the respective polyamides (A) and (B), preferably in the subsequent quantities:

(A) 60 to 85% by weight, preferably 68 to 82% by weight of the at least one partially crystalline, aliphatic polyamide; and also (B) 15 to 40% by weight, preferably 18 to 32% by weight, of the at least one partially crystalline, partially aromatic polyamide In total, the proportions of polyamides (A) and (B) thereby produce, as defined above already, 100% by weight of component (I).

In a preferred embodiment, component (I) constitutes 35 to 84.9% by weight, particularly preferably 40 to 79.8 or 40 to 69.8% by weight, of the polyamide moulding compound.

Partially Crystalline, Aliphatic Polyamide

The mixtures (component (I)) of the polyamide moulding compounds according to the invention, comprise, as component (A), at least one partially crystalline, aliphatic polyamide.

According to a preferred embodiment, the partially crystalline, aliphatic polyamide (component (A)) is selected from the group consisting of polyamide 46, polyamide 6, polyamide 56, polyamide 66, polyamide 11, polyamide 12, polyamide 1212, polyamide 1010, polyamide 1012, polyamide 1112, polyamide 610, polyamide 106, polyamide 612, polyamide 614, polyamide 616, polyamide 516, polyamide 618, polyamide 69, polyamide 810, the copolyamides thereof or the mixtures, blends or alloys thereof.

There is thereby understood as copolyamide in the above sense, a polyamide which has a plurality of the mentioned monomer units.

The spellings and abbreviations for polyamides and the monomers thereof are established in the ISO standard DIN EN ISO 16396-1:2015.

For example, the partially crystalline, aliphatic polyamide (A) has a solution viscosity $\eta_{rel}$ (also termed "relative viscosity", definition according to DIN EN ISO 307:2013), measured in m-cresol (0.5 g polymer in 100 ml m-cresol, 20° C.) in the range of 1.5 to 3.0, preferably in the range of 1.6 to 2.6, in particular in the range of 1.7 to 2.3.

Partially Crystalline, Partially Aromatic Polyamide (B)

Furthermore, the mixtures of the polyamide moulding compounds according to the invention comprise, as component (B), at least one partially crystalline, partially aromatic polyamide which is formed from a diamine component (Ba), a dicarboxylic acid component (Bb) and possibly a lactam- and/or ω-amino acid component (Bc).

If the partially crystalline, partially aromatic polyamide (B) comprises only diamines (Ba) and diacids (Bb), the molar quantities thereof add up to 50% by mol for the sum of all the diamines and 50% by mol for the sum of all the diacids and the sum of the diamine- and diacid quantities produces 100% by mol for the partially crystalline, partially aromatic polyamide (B).

With the mol-parts, hence the relative ratio of the respective compounds, which the diamine component (Ba) or the dicarboxylic acid component (Bb) constitute, can be indicated, whilst the proportions add up absolutely to 100% by mol.

If the copolyamides according to the invention comprise, in addition to diamines (Ba) and diacids (Bb), also lactams or ω-amino acids (Bc) to X % by mol, then the sum of all the diamines (Ba) is still only (50–0.5 X) % by mol and the sum of all the diacids (Bb) is (50–0.5 X) % by mol, relative to 100% by mol of partially crystalline, partially aromatic polyamide (B).

In the case of the quantity data relating to the diacids and diamines of the partially crystalline, partially aromatic polyamide (B), it applies that the sum of the molar quantities of all the diamines is essentially equal to the sum of the molar quantities of all the diacids. Essentially equal to thereby means a maximum excess of the diacids or of the diamines of 3%, i.e. the molar ratio of diacids to diamines is 1.03:1 to 1:1.03. A maximum excess of the diacids or of the diamines of 2% is preferred, i.e. the molar ratio of diacids to diamines is 1.02:1 to 1:1.02.

The quantity data with respect to the monomers should thereby be understood such that a corresponding molar ratio of these monomers used in the polycondensation is also found again in the copolyamides produced in such a way by polycondensation.

The spellings and abbreviations for polyamides and the monomers thereof are established in the ISO standard 16396-1:2015.

A preferred embodiment provides that the diamine component (Ba) is selected from
(Ba1) 65 to 90 mol-parts of 1,6-hexanediamine,
(Ba2) 10 to 35 mol-parts of bis(aminomethyl)cyclohexane and also
(Ba3) 0 to 25 mol-parts of one or more cycloaliphatic diamines, different from (Ba2)
the sum of (Ba2) and (Ba3) being 10 to 35 mol-parts and the sum of (Ba1), (Ba2) and (Ba3) being 100 mol-parts.

Further preferably, diamine component (Ba) is selected from
(Ba1) 70 to 82 mol-parts of 1,6-hexanediamine,
(Ba2) 18 to 30 mol-parts of bis(aminomethyl)cyclohexane and also
(Ba3) 0 to 12 mol-parts of one or more cycloaliphatic diamines, different from (Ba2)
the sum of (Ba2) and (Ba3) being 18 to 30 mol-parts and the sum of (Ba1), (Ba2) and (Ba3) being 100 mol-parts.

According to a particularly preferred embodiment, the diamine component (Ba) is selected from
(Ba1) 65 to 85 mol-parts of 1,6-hexanediamine,
(Ba2) 15 to 35 mol-parts of bis(aminomethyl)cyclohexane, in particular 1,3-bis(aminomethyl) cyclohexane,
the sum of (Ba1) and (Ba2) being 100 mol-parts.

As far as the diacid component is concerned, it is preferred that this is selected from
(Bb1) 70 to 100 mol-parts of terephthalic acid,
(Bb2) 0 to 15 mol-parts of isophthalic acid and also
(Bb3) 0 to 15 mol-parts of one or more aliphatic dicarboxylic acids with 6 to 18 C atoms
and the sum of (Bb1), (Bb2) and (Bb3) being 100 mol-parts.

It is further preferred that the dicarboxylic acid component (Bb) is selected from
(Bb1) 80 to 100 mol-parts of terephthalic acid,
(Bb2) 0 to 10 mol-parts of isophthalic acid and also
(Bb3) 0 to 10 mol-parts of one or more aliphatic dicarboxylic acids with 6 to 18 C atoms
and the sum of the (Bb1), (Bb2) and (Bb3) being 100 mol-parts.

According to a particularly preferred embodiment, the dicarboxylic acid component (Bb) is selected from
(Bb1) 80 to 100 mol-parts of terephthalic acid,
(Bb3) 0 to 20 mol-parts of one or more aliphatic dicarboxylic acids with 6 to 18 C atoms, in particular 6 to 12 C atoms
the sum of (Bb1) and (Bb3) being 100 mol-parts.

In a preferred embodiment, the quantity of the lactam- and/or ω-amino acid component (Bc) is 0 to 10% by mol, particularly preferably 0 to 5% by mol.

It is preferred that the sum of the mol-parts of (Ba2) bis(aminomethyl)cyclohexane, (Ba3) cycloaliphatic diamine, (Bb2) isophthalic acid and (Bb3) aliphatic dicarboxylic acid is at most 38 mol-parts, preferably at most 35 mol-parts, particularly preferably at most 30 mol-parts.

Particularly preferred is a diamine component (Ba) selected from
(Ba1) 65 to 85 mol-parts of 1,6-hexanediamine,
(Ba2) 15 to 35 mol-parts of bis(aminomethyl)cyclohexane, in particular 1,3-bis(aminomethyl) cyclohexane,
the sum of (Ba1) and (Ba2) being 100 mol-parts.

Alternatively or in addition hereto, it is likewise preferred if the dicarboxylic acid component (Bb) is selected from
(Bb1) 80 to 100 mol-parts of terephthalic acid,
(Bb3) 0 to 20 mol-parts of one or more aliphatic dicarboxylic acids with 6 to 18 C atoms, in particular 6 to 12 C atoms, very particularly preferably adipic acid, and
the sum of (Bb1) and (Bb3) being 100 mol-parts.

A further preferred embodiment provides that the at least one partially crystalline, partially aromatic polyamide has a glass transition temperature of at least 140° C., preferably of at least 145° C., particularly preferably of at least 150° C.

Preferably, the at least one partially crystalline, partially aromatic polyamide has a melting temperature of at most 340° C., preferably of at most 335° C., particularly preferably of 300 to 330° C.

It is preferred that the at least one partially crystalline, partially aromatic polyamide (B) has a crystallisation capacity determined as the difference of melting heat and crystallisation heat of at least 15 J/g, preferably at least of 20 J/g, and particularly preferably of at least 25 J/g.

Preferably, the at least one partially crystalline, partially aromatic polyamide has a relative viscosity, measured at 20° C. and a concentration of 0.5 g/dl in m-cresol, of 1.45 to 1.95, preferably of 1.50 to 1.75, particularly preferably 1.55 to 1.68.

It is preferred that the at least one partially crystalline, partially aromatic polyamide has a modulus of elasticity between 2,400 and 4,200 MPa, preferably 2,500 to 4,000 MPa, particularly preferably 2,600 to 3,900 MPa.

The previously mentioned physical parameters are thereby determined according to the standards indicated in the experimental part.

Component (II)

Furthermore, the mixtures of the moulding compounds according to the invention preferably comprise fibrous reinforcing materials (component (II)) preferably in a concentration of 15 to 60% by weight, particularly preferably 20 to 55% by weight, in the form of fibres, such as e.g. glass fibres, carbon fibres, metal fibres, whiskers and/or mineral fibres. The moulding compounds comprise, particularly preferably, 30 to 50% by weight of fibrous reinforcing materials.

Preferably, component (II) is inserted in the form of glass fibres which are used for example in the form of so-called short fibres (e.g. cut glass with a length of at least 0.2 mm, preferably 1 to 25 mm, further preferably 1.5 to 20 mm, particularly preferably 2 to 12 mm and very particularly preferably of 2 to 8 mm) or endless fibres (rovings). The glass fibres can have different cross-sectional areas which can be round, oval, elliptical, square or rectangular, glass fibres with a circular cross-section (round fibres) and with a non-circular cross-section (flat fibres) being preferred.

If the glass fibres are used as endless fibres (rovings), in the pultrusion process, they have preferably a diameter of 10 to 20 µm, preferably of 10 to 18 µm, particularly preferably of 10 to 14 µm.

The carbon fibres preferably have a diameter of 3 to 12 µm, preferably 4 to 10 µm, particularly preferably 4 to 9 µm.

A preferred embodiment of the polyamide moulding compound according to the invention is distinguished by component (II) consisting exclusively of glass fibres which are present in the range of 15-60% by weight, preferably in the range of 20-55% or 30-50% by weight, relative to the moulding compound.

Glass fibres with a circular cross-section, i.e. round glass fibres, have a diameter in the range of 3-20 µm, preferably in the range of 5-13 µm, and particularly preferably in the range of 5-10 µm. They are preferably used as short glass fibre (cut glass with a length of 0.2 to 20 mm, preferably 2-12 mm).

In the case of flat glass fibres, i.e. glass fibres with a non-circular cross-sectional area, those with a dimensional ratio of the main cross-sectional axis to the subsidiary cross-sectional axis, perpendicular thereto, of more than 2.5, preferably in the range of 2.5 to 6, in particular in the range of 3 to 5, are used preferably. These so-called flat glass fibres have a cross-sectional area which is oval, elliptical, elliptical provided with restriction(s) (so-called cocoon fibre), polygonal, rectangular or almost rectangular. A further characterising feature of the used flat glass fibres resides in the fact that the length of the main cross-sectional axis is preferably in the range of 5 to 35 µm, in particular in the range of 12 to 30 µm and the length of the subsidiary cross-sectional axis is in the range of 3 to 17 µm, in particular in the range of 4 to 10 µm. The flat glass fibres thereby have as high as possible a packing density, i.e. the glass cross-sectional area fills an imaginary rectangle which surrounds, as exactly as possible, the glass fibre cross-section to at least 70%, preferably at least 80% and particularly preferably to least 85%.

For reinforcing the moulding compounds according to the invention, also mixtures of glass fibres with a circular and non-circular cross-section can be used, the proportion of flat glass fibres preferably predominating, i.e. constituting more than 50% by weight of the total mass of the fibres.

The appearance of the glass fibres can be elongated or spiral.

Glass fibres of all types of glass can be used, such as e.g. A-, C-, D-, E-, M-, S-, R-glass, or any mixtures thereof.

Preferably component (II) is selected from the group consisting of: E-glass fibres (these consist according to ASTM D578-00 of 52-62% silicon dioxide, 12-16% aluminium oxide, 16-25% calcium oxide, 0-10% borax, 0-5% magnesium oxide, 0-2% alkali oxides, 0-1.5% titanium dioxide and 0-0.3% iron oxide; preferably they have a density of 2.58±0.04 g/cm3, a modulus of elasticity in tension of 70-75 GPa, a tensile strength of 3,000-3,500 MPa and a breaking elongation of 4.5-4.8%), A-glass fibres (63-72% silicon dioxide, 6-10% calcium oxide, 14-16% sodium- and potassium oxide, 0-6% aluminium oxide, 0-6% boron oxide, 0-4% magnesium oxide), C-glass fibres (64-68% silicon dioxide, 11-15% calcium oxide, 7-10% sodium- and potassium oxide, 3-5% aluminium oxide, 4-6% boron oxide, 2-4% magnesium oxide), D-glass fibres (72-75% silicon dioxide, 0-1% calcium oxide, 0-4% sodium and potassium oxide, 0-1% aluminium oxide, 21-24% boron oxide), basalt fibres (mineral fibre with the approximate composition: 52% SiO2, 17% $Al_2O_3$, 9% CaO, 5% MgO, 5% $Na_2O$, 5% iron oxide and also further metal oxides), AR-glass fibres (55-75% silicon dioxide, 1-10% calcium oxide, 11-21% sodium- and potassium oxide, 0-5% aluminium oxide, 0-8% boron oxide, 0-12% titanium dioxide, 1-18% zirconium oxide, 0-5% iron oxide) and also mixtures thereof.

High-strength glass fibres based on the ternary system silicon dioxide-aluminium oxide-magnesium oxide or on the quaternary system silicon dioxide-aluminium oxide-magnesium oxide-calcium oxide are a preferred embodiment of component (II), the sum of the contents of silicon dioxide, aluminium oxide and magnesium oxide being at least 78% by weight, preferably 87% and particularly preferably 92%, relative to the total glass composition.

In concrete terms, a composition of 58-70% by weight of silicon dioxide ($SiO_2$), 15-30% by weight of aluminium oxide ($Al_2O_3$), 5-15% by weight of magnesium oxide (MgO), 0-10% by weight of calcium oxide (CaO) and 0-2% by weight of further oxides, such as e.g. zirconium dioxide ($ZrO_2$), boron oxide ($B_2O_3$), titanium dioxide ($TiO_2$) or lithium oxide ($Li_2O$), is preferably used. In a further embodiment, the high-strength glass fibres have a composition of 60-67% by weight of silicon dioxide ($SiO_2$), 20-28% by weight of aluminium oxide ($Al_2O_3$), 7-12% by weight of magnesium oxide (MgO), 0-9% by weight of calcium oxide (CaO) and also 0-1.5% by weight of further oxides, such as e.g. zirconium oxide ($ZrO_2$), boron oxide ($B_2O_3$), titanium dioxide ($TiO_2$), lithium oxide ($Li_2O$).

In particular it is preferred if the high-strength glass fibre has the following composition: 62-66% by weight of silicon dioxide ($SiO_2$), 22-27% by weight of aluminium oxide ($Al_2O_3$), 8-12% by weight of magnesium oxide (MgO), 0-5% by weight of calcium oxide (CaO), 0-1% by weight of further oxides, such as e.g. zirconium dioxide ($ZrO_2$), boron oxide ($B_2O_3$), titanium dioxide ($TiO_2$), lithium oxide ($Li_2O$).

The high-strength glass fibre preferably has a tensile strength of greater than or equal to 3,700 MPa, preferably of at least 3,800 or 4,000 MPa, a breaking elongation of at least 4.8%, preferably of at least 4.9 or 5.0%, and a modulus of elasticity in tension of greater than 75 GPa, preferably of more than 78 or 80 GPa, these glass properties requiring to be determined on individual fibres (pristine single filament) with a diameter of 10 µm and a length of 12.7 mm at a temperature of 23° C. and a relative air humidity of 50%. Concrete examples of these high-strength glass fibres of component (II) are S-glass fibres by Owens Corning with 995-size, T-glass fibres by Nittobo, HiPertex of 3B, HS4-glass fibres by Sinoma Jinjing Fiberglass, R-glass fibres by Vetrotex and also S-1- and S-2-glass fibres by AGY.

The glass fibres used according to the invention, for example as roving (endless fibres), have a diameter (in the case of round glass fibres) or a subsidiary cross-sectional axis (in the case of flat glass fibres) of 8 to 20 µm, preferably of 12 to 18 µm, the cross-section of the glass fibres being able to be round, oval, elliptical, elliptical provided with constriction(s), polygonal, rectangular or almost rectangular. So-called flat glass fibres with a ratio of cross-sectional axes, i.e. a ratio of main- to subsidiary cross-sectional axis, of 2.5 to 5 are particularly preferred. The endless fibres can be produced from the above-described types of glass, endless fibres based on E-glass and high-strength types of glass being preferred. These endless fibres are incorporated in the polyamide moulding compounds according to the invention by known processes for the production of long-fibre-reinforced rod-shaped granulate, in particular by pultrusion methods, in which the endless fibre strand (roving) is saturated completely with the polymer melt and subsequently cooled and cut. The long-fibre-reinforced rod-shaped granulate obtained in this manner, which has preferably a granulate length of 3 to 25 mm, in particular of 4 to 12 mm, can be further processed by normal processing methods (such as e.g. injection moulding, pressing) to form moulded parts.

There are preferred, as component (II), glass fibres made of E-glass, with a non-circular cross-section (flat fibres) and with an axis ratio of the main cross-sectional axis to the subsidiary cross-sectional axis of at least 2.5, and/or high-strength glass fibres with a circular or non-circular cross-section and a glass composition, based essentially on the components silicon dioxide, aluminium oxide and magnesium oxide, the proportion of magnesium oxide (MgO) being 5-15% by weight and the proportion of calcium oxide 0-10% by weight.

The glass fibres of component (II) preferably have, as flat E-glass fibres, a density of 2.54-2.62 g/cm$^3$, a modulus of elasticity in tension of 70-75 GPa, a tensile strength of 3,000-3,500 MPa and a breaking elongation of 4.5-4.8%, the mechanical properties having been determined on individual fibres with a diameter of 10 μm and a length of 12.7 mm at 23° C. and a relative air humidity of 50%.

The glass fibres according to the invention can be provided with a size which is suitable for thermoplastics, in particular for polyamide, comprising an adhesive based on an amino- or epoxysilane compound.

In general, according to a further preferred embodiment of the invention, component (II), which is present preferably in the moulding compound in a proportion in the range of 20-60% by weight, in particular in the range of 25-55% by weight, therefore concerns glass fibres, carbon fibres, or a mixture of such fibres, preferably concerning glass fibres, particularly preferably glass fibres with a circular cross-sectional area, glass fibres with a non-circular cross-sectional area, or a mixture of such glass fibres, particularly preferably glass fibres with a circular cross-sectional area having a diameter in the range of 3-12 μm, preferably in the range of 5-13 μm and particularly preferably in the range of 5-12 μm, and glass fibres with a non-circular cross-sectional area having preferably a dimensional ratio of the main cross-sectional axis to the subsidiary cross-sectional axis, perpendicular thereto, of more than 2.5, preferably in the range of 2.5-6 or 3-5, the main cross-sectional axis preferably having a length in the range of 5-35 μm, preferably in the range of 12-30 μm and the subsidiary cross-sectional axis preferably having a length in the range of 3-17 μm, preferably in the range of 4-10 μm.

The fibrous reinforcing materials can be surface-treated, i.e. they can be equipped with a suitable size- or adhesive system. For this purpose, for example systems based on fatty acids, waxes, silanes, titanates, polyamides, urethanes, polyhydroxy ethers, epoxides, nickel respectively combinations or mixtures thereof can be used.

Component (III)

The mixture of the polyamide moulding compound optionally comprises, in the form of component (III), also particulate fillers which are, according to their nature, different from the other components of the polyamide moulding compound, preferably in a proportion of at most 30 percent by weight.

According to a preferred embodiment, component (III) is present in a proportion, relative to the sum of components (I)-(VI), in the range of at most 20% by weight, preferably in the range of at most 10% by weight, particularly preferably in the range of 0.1-5% by weight.

Component (III) can, in general, comprise spheroid and/or ellipsoid fillers or be constructed from these, preferably silicate-, metal-, plastic material-, metal oxide-, glass-, mineral material-, dye-, pigment particles and also mixtures of such particles, the fillers of component (III) being selected particularly preferably as fillers in surface-treated or untreated form, selected from the group consisting of: talc, mica, silicate, such as in particular iron aluminium silicate- and/or sodium aluminium silicate particles, quartz, quartz dust, titanium dioxide, wollastonite, kaolin, silicic acids, in particular amorphous silicic acids, ground or precipitated calcium carbonate, magnesium carbonate, magnesium hydroxide, chalk, lime, feldspar, mica, barium sulphate, barium titanate, zinc sulphide, titanium dioxide, zinc oxide, glass balls, in particular solid or hollow glass balls, ground glass, in particular ground glass fibres, glass chips, glass flakes, permanently magnetic or magnetisable metal compounds and/or alloys, inorganic pigments, such as in particular iron oxide, iron manganese oxide, metal powder, in particular iron powder, copper powder, aluminium powder, metal flakes, in particular aluminium flakes, iron flakes, metal-coated fillers, metal oxides, in particular spinels, in particular copper iron spinel, copper chromium oxide, copper chromite ($CuCr_2O_4$), zinc iron oxide, cobalt chromium oxide, cobalt aluminium oxide, magnesium aluminium oxide, copper-chromium-manganese mixed oxides, copper-manganese-iron mixed oxides, nickel-antimony-titanate, chromium-antimony-titanate, hard- or soft magnetic metals or alloys or ceramics, hollow-ball silicate fillers, aluminium oxide, boron nitride, boron carbide, aluminium nitride, calcium fluoride, and also mixtures of the elements from this group.

According to this further preferred embodiment, the moulding compound can comprise, i.e. as component (III), further fillers, in a proportion in the range of at most 20% by weight, preferably in the range of at most 10% by weight, particularly preferably in the range of 0.1-5% by weight, in the polyamide moulding compound, the thermoplastic moulding compounds according to the invention being able to comprise also a particulate filler or a mixture of two or more different particulate fillers in combination with reinforcing materials.

The fillers can be surface-treated, i.e. they can be equipped with a suitable size- or adhesive system. For this purpose, for example systems based on fatty acids, waxes, silanes, titanates, polyamides, urethanes, polyhydroxyethers, epoxides, nickel respectively combinations or mixtures thereof can be used.

Component (IV)

The moulding compound according to the invention can comprise in addition up to 20% by weight of one or more impact modifiers (SZM, component (IV)). There is preferred a SZM concentration in the range between 5 and 15% by weight, in particular of 5-12% by weight. In particular, it is preferred that the moulding compound is free of impact modifiers.

Generally impact modifiers are selected from the group consisting of: olefin polymers, low-, average- and high-density polyethylenes, polypropylene, polybutadiene, poly-4-methylpentene, ethylene-propylene block- or statistical copolymers, ethylene-methylhexadiene copolymers, propylene-methylhexadiene copolymers, ethylene-propylenebutene copolymers, ethylene-propylene-hexene copolymers, ethylene-propylene-methylhexadiene copolymers, poly(ethylene-vinylacetate) (EVA), poly(ethylene-ethylacrylate) (EEA), ethylene-octene copolymer, ethylene-butene copolymer, ethylene-hexene copolymer, ethylene-propylene-diene terpolymers and also combinations of the mentioned polymers, preferably functionalised with acid anhydride groups.

The SZM can be a natural rubber, polybutadiene, polyisoprene, polyisobutylene, a mixed polymer of butadiene and/or isoprene with styrene or styrene derivates and other comonomers, a hydrated mixed polymer and or a mixed polymer, which is produced by grafting or copolymerisation with acid anhydrides, (meth)acrylic acid and the esters thereof. The impact modifier can also be a graft rubber with a crosslinked elastomer core, which consists of butadiene, isoprene or alkylacrylates and has a graft shell made of polystyrene, a nonpolar or polar olefin homo- and copolymer such as ethylene-propylene-, ethylene-propylene-diene- and ethylene-octene- or ethylene-vinyl acetate rubber or a nonpolar or polar olefin homo- and copolymer, which was produced by grafting or copolymerisation with acid anhydrides, (meth)acrylic acid and the esters thereof. The impact modifier can also be a carboxylic acid-functionalised copolymer such as poly(ethene-co-(meth)acrylic acid) or poly(ethene-co-1-olefin-co-(meth)acrylic acid), the 1-olefin being able to be an alkene or an unsaturated (meth)acrylic acid ester with more than 4 atoms, including those copolymers, in which the acid groups are neutralised partially with metal ions.

Preferred impact modifiers based on styrene monomers (styrene and styrene derivatives) and other vinyl aromatic monomers are block copolymers constructed from alkenyl aromatic compounds and a conjugated diene, and also hydrated block copolymers made of an alkenyl aromatic compound and conjugated dienes or combinations of these SZM types. The block copolymer comprises at least one block derived from an alkenyl aromatic compound ($A_E$) and at least one block derived from a conjugated diene ($B_E$). In the case of the hydrated block copolymers, the proportion of aliphatically unsaturated carbon-carbon double bonds was reduced by hydration. As block copolymers, two-, three-four- and polyblock copolymers with a linear structure are suitable. However, branched and star-shaped structures can likewise be used. Branched block copolymers are obtained in the known manner, e.g. by graft reactions of polymer "side-branches" on a polymer main chain. As alkenyl aromatic monomers, in addition to or in a mixture with styrene, also vinyl aromatic monomers can be used, which are substituted on the aromatic ring and/or on the C=C double bond with C1-20 hydrocarbon radicals or halogen atoms.

Examples of alkenyl aromatic monomers are styrene, p-methylstyrene, α-methylstyrene, ethylstyrene, tert.-butylstyrene, vinyltoluene, 1,2-diphenylethylene, 1,1-diphenylethylene, vinylxylols, vinyltoluenes, vinylnaphthalenes, divinylbenzenes, bromostyrenes, chlorostyrenes, and also combinations thereof. Styrene, p-methylstyrene, alpha-methylstyrene and vinylnaphthalene are preferred.

As diene monomers e.g. 1,3-butadiene, 2-methyl-1,3-butadiene, 2,3-dimethyl-1,3-butadiene, 1,3-pentadiene, 1,3-hexadiene, isoprene, chloroprene and piperylene are possible. 1,3-butadiene and isoprene are preferred, in particular 1,3-butadiene (subsequently termed briefly butadiene).

Preferably there are used as alkenyl aromatic monomer, styrene, and as diene monomer, butadiene, i.e. styrene-butadiene block copolymer is preferred. Generally the block copolymers are produced by anionic polymerisation in a known manner.

Furthermore, in addition to the styrene- and diene monomers, further comonomers can be jointly used. The proportion of the comonomers is preferably 0 to 50, particularly preferably 0 to 30, and in particular 0 to 15% by weight, relative to the total quantity of the used monomers. Suitable comonomers are e.g. acrylates, in particular C1-12 alkylacrylates such as n-butylacrylate or 2-ethylhexylacrylate, and the corresponding methacrylates, in particular C1-12 alkylmethacrylates, such as methylmethacrylate (MMA). Further possible comonomers are (meth)acrylonitrile, glycidyl(meth)acrylate, vinylmethylether, diallyl- and divinylether of bifunctional alcohols, divinylbenzene and vinylacetate.

In addition to the conjugated diene, the hydrated block copolymers of the impact modifiers possibly also comprise proportions of low hydrocarbons, such as e.g. ethylene, propylene, 1-butene, dicyclopentadiene or non-conjugated dienes. In the hydrated block copolymers, the proportion of the non-reduced aliphatic unsaturated compounds, which result from block B, is less than 50%, preferably less than 25%, in particular less than 10%. The aromatic proportions from block A are reduced at most to 25%. The hydrated block copolymers styrene-(ethylene-butylene)-two block and styrene-(ethylene-butylene)-styrene three-block copolymers are obtained by hydration of styrene-butadiene- and styrene-butadiene-styrene copolymers. The block copolymers consist preferably up to 20 to 90% by weight of block ($A_E$), in particular up to 50 to 85% by weight of block ($A_E$). The diene can be incorporated in 1,2- or in 1,4-orientations in block ($B_E$).

Examples of non-hydrated block copolymers are polystyrene-polybutadiene, polystyrene-poly(ethylene-propylene), polystyrene-polyisoprene, poly(α-methyl-styrene)-polybutadiene, polystyrene-polybutadiene-polystyrene (SBS), polystyrene-poly(ethylene-propylene)-polystyrene, polystyrene-polyisoprene-polystyrene and poly(α-methylstyrene-polybutadiene-poly(α-methylstyrene) and also combinations hereof.

Suitable non-hydrated block copolymers, which are commercially available, are various products with the trade names SOLPRENE® (Phillips), KRATON® (Shell), VECTOR® (Dexco) and SEPTON® (Kuraray).

According to a further preferred embodiment, the moulding compounds according to the invention are characterised in that the impact modifier comprises a polyolefin homopolymer or an ethylene-α-olefin copolymer, particularly preferably an EP- and/or EPDM-elastomer (ethylene-propylene rubber respectively ethylene-propylene-diene rubber). Thus it can concern for example an elastomer, which is based on an ethylene-C3-12-α-olefin copolymer with 20 to 96, preferably 25 to 85% by weight of ethylene, for particular preference the C3-12-α-olefin concerning an olefin selected from the group propene, 1-butene, 1-pentene, 1-hexene, 1-octene, 1-decene and/or 1-dodecene, and for particular preference component C concerning ethylene-propylene rubber and/or LLDPE and/or VLDPE.

Alternatively or additionally (for example in a mixture), the impact modifier can comprise a terpolymer based on ethylene-C3-12-α-olefin with an unconjugated diene, this preferably comprising 25 to 85% by weight of ethylene and up to at most in the range of 10% by weight of an unconjugated diene, the C3-12-α-olefin concerning particularly preferably an olefin selected from the group propene, 1-butene, 1-pentene, 1-hexene, 1-octene, 1-decene and/or 1-dodecene, and/or the unconjugated diene being selected preferably from the group bicyclo(2.2.1)heptadiene, 1,4-hexadiene, dicyclopentadiene and/or in particular 5-ethylidenenorbornene.

As component for the impact modifiers, there are possible in addition also ethylene-acrylate copolymers. Further possible forms as components for component (III) are ethylene-butylene copolymers or mixtures (blends) which such systems comprise.

Preferably, the impact modifier has components with acid anhydride groups which are introduced by thermal or radical reaction of the main chain polymer with an unsaturated dicarboxylic acid anhydride, an unsaturated dicarboxylic acid or an unsaturated dicarboxylic acid monoalkyl ester in a concentration which suffices for good bonding to the polyamide, reagents preferably being used for this purpose, selected from the following group: maleic acid, maleic acid anhydride, maleic acid monobutyl ester, fumaric acid, aconitic acid and/or itaconic acid anhydride.

Preferably, 0.1 to 4.0% by weight of an unsaturated anhydride is grafted onto the impact component as component of the impact modifier or the unsaturated dicarboxylic acid anhydride or the precursor thereof is grafted on together with a further unsaturated monomer. In general, the degree of grafting is preferably in a range of 0.1-1.0%, particularly preferably in a range of 0.3-0.7%. Also possible as a component of component (IV) is a mixture of an ethylene-propylene copolymer and an ethylene-butylene copolymer, this with a maleic acid anhydride grafting degree (MAH grafting degree) in the range of 0.3-0.7%. The above-indicated possible systems for the component can also be used in mixtures.

Furthermore, the impact modifier can have components which have functional groups, such as e.g. carboxylic acid-, ester-, epoxy-, oxazoline-, carbodiimide-, isocyanate-, silanol- and carboxylate groups, or comprise combinations of two or more of the mentioned functional groups. Monomers which carry these functional groups can be bonded by copolymerisation or grafting to the elastomeric polyolefin. In addition, the SZM based on olefin polymers can also be modified by grafting with an unsaturated silane compound, e.g. vinyltrimethoxysilane, vinyltriethoxysilane, vinyltriacetosilane, methacryloxypropyltrimethoxysilane or propenyltrimethoxysilane.

The elastomeric polyolefins are statistical, alternating or segmented copolymers with a linear, branched or core-shell structure and comprise functional groups which can react with the end groups of the polyamides so that sufficient compatibility between polyamide and SZM results.

The SZM which are used include therefore homopolymers or copolymers of olefins, such as e.g. ethylene, propylene, 1-butene, or copolymers of olefins and copolymerisable monomers, such as vinyl acetate, (meth)acrylic acid ester and methylhexadiene.

The following olefin polymers are particularly preferred: low-, average- and high-density polyethylenes, polypropylene, polybutadiene, poly-4-methylpentene, ethylene-propylene block- or statistical copolymers, ethylene-methylhexadiene copolymers, propylene-methylhexadiene copolymers, ethylene-propylene-butene copolymers, ethylene-propylene-hexene copolymers, ethylene-propylene-methylhexadiene copolymers, poly(ethylene-vinyl acetate) (EVA), poly(ethylene-ethyl acrylate) (EEA), ethylene-octene copolymer, ethylene-butene copolymer, ethylene-hexene copolymer, ethylene-propylene-diene terpolymers and also combinations of the mentioned polymers. It is preferred in particular if these olefin polymers are functionalised with acid anhydride groups. Examples of commercially available impact modifiers which can be used within the scope of the components of component (IV) are: TAFMER MC201, TAFMER MH5010, TAFMER MH7010, TAFMER MH7020 by Mitsui Chemicals; EXXELOR VA1801, EXXELOR VA1803, EXXELOR VA1810, EXXELOR MDEX 94-11, Exxon Mobile Chemical; FUSABOND MN493D, FUSABOND A EB560D; ELVALOY, DuPont.

Also an ionomer is preferred as impact modifier in which the polymer-bonded carboxyl groups are connected together entirely or partially by metal ions.

Particularly preferred are mixed polymers of butadiene with styrene, functionalised by grafting with maleic acid anhydride, non-polar or polar olefin homo- and copolymers which are produced by grafting with maleic acid anhydride and carboxylic acid-functionalised copolymers, such as poly(ethene-co-(meth)aryl acid) or poly(ethene-co-1-olefin-co-(meth)acrylic acid) in which the acid groups are neutralised partially with metal ions.

Component (V)

As optional component (V), the mixtures of the thermoplastic moulding compounds according to the invention comprise at least one heat stabiliser (or synonymously thermal stabiliser), preferably in a concentration of 0.1 to 2.0% by weight, particularly preferably of 0.15 to 1.8% by weight or 0.2 to 1.5% by weight.

In a preferred embodiment, the heat stabilisers are selected from the group consisting of compounds of mono- or bivalent copper, e.g. salts of mono- or bivalent copper with inorganic or organic acids or mono- or bivalent phenols, the oxides of mono- or bivalent copper, or the complex compounds of copper salts with ammonia, amines, amides, lactams, cyanides or phosphines, preferably Cu(I)- or Cu(II) salts of hydrohalic acids, of hydrocyanic acids or the copper salts of the aliphatic carboxylic acids. Particularly preferred are the monovalent copper compounds CuCl, CuBr, CuI, CuCN and $Cu_2O$, and also the bivalent copper compounds $CuCl_2$, $CuSO_4$, CuO, copper(II) acetate or copper(II) stearate. If a copper compound is used, the quantity of copper is preferably 0.02 to 0.5, in particular 0.03 to 0.35 and particularly preferably 0.05 to 0.25% by weight, relative to the sum of the other components, i.e. relative to the total polyamide moulding compound.

The copper compounds are commercially available or their production is known to the person skilled in the art. The copper compound can be used as such or in the form of concentrates. There should be understood by concentrate thereby a polymer, preferably of the same chemical nature as polyamides (A) or (B) which comprises the copper salt in a high concentration. The use of concentrates is a normal method and is applied particularly frequently when very small quantities of an input material are to be metered in. Advantageously, the copper compounds are used in combination with further metal halogenides, in particular alkali halogenides, such as NaI, KI, NaBr, KBr, the molar ratio of metal halogenide to copper halogenide being 0.5 to 20, preferably 1 to 10 and particularly preferably 3 to 7.

stabilisers based on secondary aromatic amines, these stabilisers being present preferably in a quantity of 0.2 to 2.0, preferably of 0.2 to 1.5% by weight, stabilisers based on sterically hindered phenols, these stabilisers being present preferably in a quantity of 0.1 to 1.5, preferably of 0.2 to 1.0% by weight, and phosphites and phosphonites, and also mixtures of the above-mentioned stabilisers.

Particularly preferred examples of the stabilisers which can be used according to the invention based on secondary amines are adducts made of phenylenediamine with acetone (Naugard A), adducts made of phenylenediamine with linolein, Naugard 445, N,N'-dinaphthyl-p-phenylenediamine, N-phenyl-N'-cyclohexyl-p-phenylenediamine or mixtures of two or more thereof.

Preferred examples of the stabilisers which can be used according to the invention based on sterically hindered phenols are N,N'-hexamethylene-bis-3-(3,5-di-tert-butyl-4-hydroxyphenyl)propionamide, bis-(3,3-bis-(4'-hydroxy-3'-tert-butylphenyl)butanoic acid)glycolester, 2,1'-thioethyl-bis-(3-(3,5-di.tert-butyl-4-hydroxyphenyl)propionate, 4-4'-butylidene-bis-(3-methyl-6-tert.-butylphenol), triethyleneglycol-3-(3-tert-butyl-4-hydroxy-5-methylphenyl)propionate or mixtures of two or more of these stabilisers.

Preferred phosphites and phosphonites are triphenylphosphite, diphenylalkylphosphite, phenyldialkylphosphite, tris(nonylphenyl)phosphite, trilaurylphosphite, trioctadecylphosphite, distearylpentaerythritoldiphosphite, tris(2,4-di-tert-butylphenyl) phosphite, diisodecylpentaerythritoldiphosphite, bis(2,4-di-tert-butylphenyl)pentaerythritoldiphosphite, bis(2,6-di-tert-butyl-4-methylphenyl)pentaerythritoldiphosphite, diisodecyloxypentaerythritoldiphosphite, bis(2,4-di-tert-butyl-6-methylphenyl) pentaerythritoldiphosphite, bis(2,4,6-tris-(tert-butylphenyl)-pentaerythritoldiphosphite, tristearylsorbitoltriphosphite, tetrakis-(2,4-di-tert-butylphenyl)-4,4'-biphenylenediphosphonite, 6-isooctyloxy-2,4,8,10-tetra-tert-butyl-12H-dibenzo[d,g]-1,3,2-dioxaphosphocin, 6-fluoro-2,4,8,10-tetra-tert-butyl-12-methyl-dibenzo[d,g]-1,3,2-dioxaphosphocin, bis(2,4-di-tert-butyl-6-methylphenyl)methylphosphite and bis(2,4-di-tert-butyl-6-methylphenyl)ethylphosphite. In particular tris[2-tert-butyl-4-thio(2'-methyl-4'-hydroxy-5'-tert-butyl)-phenyl-5-methyl] phenylphosphite and tris(2,4-di-tert-butylphenyl)phosphite are preferred.

In particular, a heat stabiliser exclusively based on CuI and KI is preferred. In addition to the addition of copper or copper compounds, also further transition metal compounds, in particular metal salts or metal oxides of the group VB, VIB, VIIB or VIIIB of the periodic table can be used. Furthermore, transition metals of the group VB, VIB, VIIB or VIIIB of the periodic table, such as e.g. iron- or steel powder, can be added to the moulding compound according to the invention.

In general, according to a further preferred embodiment, component (V) which is preferably present in the moulding compound in a proportion in the range of 0.1-2.0% by weight, preferably in the range of 0.20-1.5% by weight, concerns therefore a system selected from the following group: compounds of mono- or bivalent copper, stabilisers based on secondary aromatic amines, stabilisers based on sterically hindered phenols, phosphites, phosphonites, and also mixtures thereof.

Preferred organic stabilisers are phenol- and/or phosphite compounds, such as e.g. Irganox 245, Irganox 1010, Irganox 1098, Hostanox PAR 24, Anox 20 or Irgafos 168. For particular preference, Irganox 1010 is in a concentration of equal to or less than 0.5% by weight.

Component (VI)

The mixture of the polyamide moulding compound comprises optionally, in the form of component (VI), also further auxiliary materials and/or additives, different from the other components (I) to (V), in a proportion of at most 6.0% by weight.

According to a preferred embodiment, component (VI) is present in a proportion, relative to the total polyamide moulding compound, in the range of 0.1-4.0% by weight, particularly preferably in the range of 0.2-3.0% by weight.

Preferably, component (VI) is selected from the following group: crystallisation accelerators or retardants, flow aids, lubricants, mould-release agents, pigments, dyes and marking materials, processing aids, anti-static agents, carbon black, graphite, carbon nanotubes, residues from polymerisation processes, such as catalysts, salts and derivatives thereof, antioxidants, antiozonants, light protection means, UV stabilisers, UV absorbers or UV blockers, IR absorbers, NIR absorbers, anti-blocking agents, nucleation agents, chain regulators, defoamers, chain-lengthening additives, conductivity additives, separation agents, organic pigments, carbon black, graphite, graphene, photochromic agents, mould-release agents, optical brighteners, and also mixtures and combinations hereof.

Components (II) to (VI) can be added respectively also in master batch form. Preferably, a polyamide is used as basic polymer of the master batch. The polyamide used for this purpose is in particular a polyamide (A) of components (I).

According to the invention, moulded articles which are producible from the previously described moulding compounds are likewise provided. These moulded articles are present preferably in the form of a component which is usable, for example in automobiles, in particular in the interior, in the sanitary sphere, in particular for hot water applications, in the household sphere, in particular for coffee machines, electric kettles, immersion coils, dishwashers, washing machines, in measuring, regulating and control technology, in particular for actuators, sensors, transmissions, compressed air controls, valves, both for hydraulics and pneumatics or in mechanical engineering.

The subject according to the invention is intended to be explained in more detail, with reference to the following examples, without wishing to restrict said subject to the specific embodiments illustrated here.

EXAMPLES

Within the scope of this application, the following measuring methods were used:

The measurements were implemented according to the following standards and on the following test pieces:

Test pieces in the dry state are stored after injection moulding for at least 48 h at room temperature in a dry environment, i.e. over silica gel. Conditioned test pieces are stored according to ISO 1110 (1998-03) for 14 days at 72° C. and 62% relative humidity.

The thermal behaviour (melting point ($T_m$), melt enthalpy ($\Delta H_m$), glass transition temperature ($T_g$)) was determined on the granulate by means of the ISO standard 11357-1, -2 and -3 (2013-04). Differential Scanning Calorimetry (DSC) was implemented at a heating rate of 20 K/min.

The relative viscosity ($\eta_{rel}$) was determined according to DIN EN ISO 307 (2013-08) on solutions of 0.5 g polymer, dissolved in 100 ml m-cresol at a temperature of 20° C. Granulate is used as sample.

Modulus of Elasticity in Tension, Breaking Stress and Breaking Elongation:

modulus of elasticity in tension, breaking stress and breaking elongation were determined according to ISO 527 (2012-06) with a tensile speed of 1 mm/min (modulus of elasticity in tension) or with a tensile speed of 5 mm/min (breaking stress, breaking elongation) on the ISO tensile bar, standard ISO/CD 3167 (2014-11), type A1, 170×20/10×4 mm at a temperature 23° C., 80° C. and 100° C. in the dry and conditioned state.

The thermostability HDT/A (1.8 MPa) and HDT/C (8.0 MPa) was implemented according to DIN EN ISO 75-1, -2 (2013-04) on the ISO impact bar with the dimension 80×10×4 mm in flat edge position.

Water Absorption:

ISO tensile bars were stored in water at a temperature of 95° C. for the duration of 336 hours. After drying the surface with a cotton cloth, the percentage increase in weight, relative to the initial weight (dry ISO tensile bar), was determined.

The precondensate was postcondensed in a twin-screw extruder of the company Werner & Pfleiderer, type ZSK 25. For this purpose, cylinder temperatures of 10 to 80° C. were set in the first 4 zones, in the remaining zones cylinder temperatures of 300 to 360° C. in a rising and again falling temperature profile were used. The melt was degassed in the second zone in front of the nozzle by a nitrogen flow. The screw speed of rotation was 250 rpm, the throughput 6 kg/h. The polyamide was discharged as a strand through a nozzle, a nozzle temperature of 330° C. being set. The strand was cooled in a water bath at 80° C. and subsequently granulated. The granulate was dried for 24 hours at 120° C. at reduced pressure (30 mbar), to a water content of below 0.1% by weight.

Polyamides PA-4 and PA-5 were produced according to EP 1 930 372 A2. PA-5 thereby corresponds to comparative example 10.

The polyamides listed in table 1 were used for the polyamide moulding compounds examined in tables 2 and 3.

TABLE 1 polyamides used

| Designation | Polymer | Composition (% by mol) | $T_g$ [° C.] | $T_m$ [° C.] | $\eta_{rel}$ |
|---|---|---|---|---|---|
| Component (A) | | | | | |
| PA 66 | RADIPOL A45 | | | 260 | 1.85 |
| PA 6 | GRILON F34 | | | 222 | 2.05 |
| PA 610 | Polyamide PA610 | | | 225 | 1.95 |
| PA 1010 | Polyamide PA1010 | | | 220 | 1.75 |
| PA 46 | STANYL TE300 NAT. | | | 294 | 2.00 |
| PA 12 | GRILAMID L25 NAT. | | | 178 | 2.25 |
| Component (B) | | | | | |
| PA-1 | 6T/BACT/66/BAC6 | 68.5/23.5/6/2 | 150 | 325 | 1.62 |
| PA-2 | 6I/6T (Grivory G21, EMS-CHEMIE, Switzerland) | 67/33 | 125 | — | 1.52 |
| PA-3 | 6T/6I (Grivory HT XE 3733 NK, EMS-CHEMIE, Switzerland) | 70/30 | 135 | 325 | 1.59 |
| PA-4 | 6I/6T/MACMI/MACMT/PACMI/PACMT/12 | 40/40/6.5/6.5/2/2/3 | 160 | — | 1.61 |
| PA-5 | 6I/MACMI/6T/MACMT | 76.5/13.5/8.5/1.5 | 148 | — | 1.46 |

Production of the copolyamides, of the moulding compounds and of the moulded articles was effected according to the following synthesis method.

Production of polyamide PA-1 (6T/BACT/66/BAC6)

In a 20 l autoclave, 3.48 kg deionised water was placed and 2.46 kg 1,6-hexanediamine (Ba1), 1.00 kg 1,3-bis-(aminomethyl)cyclohexane (Ba2), 4.20 kg terephthalic acid (Bb1), 0.32 kg adipic acid, (Bb3) and 4.48 g phosphinic acid (50% by weight aqueous solution), as condensation catalyst and 3.2 g Antifoam RD 10% by weight emulsion as defoamer were added. Thereafter the solution was made inert with nitrogen six times. Heating to the reaction temperature of 260° C. took place with agitation. This was effected at a pressure of 32 bar. The batch was kept in the pressure phase for 1.5 hours at the reaction temperature and subsequently discharged with steam via a nozzle. The precondensate was dried for 24 hours at 110° C. and in a vacuum of 30 mbar.

Production of the Polyamide Moulding Compounds

The components indicated in tables 1 to 3 were compounded in the above-mentioned concentrations in a twin-screw extruder of the company Werner and Pfleiderer with a screw diameter of 25 mm with prescribed process parameters (cylinder temperatures: rising from 260 to 290° C.; speed of rotation: 250 rpm; throughput: 12 kg/h). The polyamides of components A and B and also the heat stabiliser were hereby metered into the feed zone, whilst the glass fibres were metered into the polymer melt via a sidefeeder 3 housing units in front of the nozzle. The compounds were drawn off as a strand from a nozzle with 3 mm diameter and granulated after water cooling. The granulate was dried for 24 hours at 110° C. in a vacuum at 30 mbar.

The compounds were then injected with an injection moulding machine Arburg Allrounder 320-210-750 to form sample bodies at cylinder temperatures of 280 to 315° C. and a mould temperature of 110 to 150° C.

TABLE 2

| | Components | Unit | \multicolumn{5}{c}{examples according to the invention} |
| | | | E1 | E2 | E3 | E4 | E5 |
|---|---|---|---|---|---|---|---|
| I (A) | PA 66 | % by wt. | 40.75 | 37.75 | 34.75 | 31.75 | 25.75 |
| | PA 6 | % by wt. | | | | | |
| | PA 610 | % by wt. | | | | | |
| | PA 1010 | % by wt | | | | | |
| | PA 46 | % by wt. | | | | | |
| | PA 12 | % by wt. | | | | | |
| I (B) | PA 1 | % by wt. | 9 | 12 | 15 | 18 | 24 |
| | PA 2 | % by wt. | | | | | |
| | PA 3 | % by wt. | | | | | |
| | PA 4 | % by wt. | | | | | |
| | PA 5 | % by wt. | | | | | |
| II | Glass fibres | % by wt. | 50 | 50 | 50 | 50 | 50 |
| V | Stabiliser | % by wt. | 0.25 | 0.25 | 0.25 | 0.25 | 0.25 |
| | E. mod. in tension 23° C., dry | MPa | 15,750 | 16,500 | 16,000 | 16,000 | 16,000 |
| | E. mod. in tension 80° C., dry | MPa | 9,500 | 9,750 | 9,750 | 10,000 | 11,000 |
| | E. mod. in tension 100° C., dry | MPa | 7,750 | 8,250 | 8,500 | 9,000 | 9,000 |
| | E. mod. in tension 23° C., cond. | MPa | 13,250 | 14,750 | 15,000 | 15,500 | 15,500 |
| | E. mod. in tension 80° C., cond. | MPa | 7,500 | 8,250 | 8,250 | 8,500 | 8,750 |
| | E. mod. in tension 100° C., cond. | MPa | 6,500 | 6,750 | n.d. | n.d. | 7,000 |
| | Breaking stress 23° C., dry | MPa | 225 | 245 | 245 | 245 | 245 |
| | Breaking stress 80° C., dry | MPa | 140 | 145 | 145 | 145 | 145 |
| | Breaking stress 100° C., dry | MPa | 125 | 125 | 125 | 125 | 125 |
| | Breaking stress 23° C., cond. | MPa | 170 | 190 | 190 | 195 | 195 |
| | Breaking stress 80° C., cond. | MPa | 100 | 105 | 105 | 105 | 110 |
| | Breaking stress 100° C., cond. | MPa | 95 | 95 | n.d. | n.d. | 100 |
| | Breaking elongation 23° C., dry | % | 2.7 | 2.7 | 2.5 | 2.5 | 2.4 |
| | Breaking elongation 80° C., dry | % | 4.9 | 4.8 | 4.5 | 4.5 | 3.9 |
| | Breaking elongation 100° C., dry | % | 6.1 | 5.9 | 4.5 | 5.2 | 5.4 |
| | Breaking elongation 23° C., cond. | % | 3.7 | 3.5 | 2.9 | 2.7 | 2.6 |
| | Breaking elongation 80° C., cond. | % | 5.5 | 5.3 | 5.0 | 5.1 | 5.5 |
| | Breaking elongation 100° C., cond. | % | 5.6 | 5.7 | n.d. | n.d. | 6.1 |
| | HDT A (1.8 MPa), dry | ° C. | 250 | 250 | 250 | 250 | 250 |
| | HDT C (8 MPa), dry | ° C. | 200 | 200 | 205 | 205 | 210 |
| | Water absorption, 336 h, 95° C. in water | % by wt. | 3.57 | 3.53 | n.d. | n.d. | 3.3 |

| | Components | Unit | E6 | E7 | E8 | E9 | E10 |
|---|---|---|---|---|---|---|---|
| I (A) | PA 66 | % by wt. | 30.47 | | | | |
| | PA 6 | % by wt. | 7.28 | | | | |
| | PA 610 | % by wt. | | 37.75 | | | |
| | PA 1010 | % by wt. | | | 37.75 | | |
| | PA 46 | % by wt. | | | | 38.00 | |
| | PA 12 | % by wt. | | | | | 37.75 |
| I (B) | PA 1 | % by wt. | 12 | 12 | 12 | 12 | 12 |
| | PA 2 | % by wt. | | | | | |
| | PA 3 | % by wt. | | | | | |
| | PA 4 | % by wt. | | | | | |
| | PA 5 | % by wt. | | | | | |
| II | Glass fibres | % by wt. | 50 | 50 | 50 | 50 | 50 |
| V | Stabiliser | % by wt. | 0.25 | 0.25 | 0.25 | 0 | 0.25 |
| | E. mod. in tension 23° C., dry | MPa | 16,000 | 16,000 | 14,500 | 15,250 | 13,250 |
| | E. mod. in tension 80° C., dry | MPa | 8,750 | 9,250 | 8,000 | 10,25 | 7,000 |
| | E. mod. in tension 100° C., dry | MPa | 7,500 | 8,000 | 7,250 | 8,500 | 6,500 |
| | E. mod. in tension 23° C., cond. | MPa | 13,000 | 14,250 | 13,250 | 12,750 | 12,250 |
| | E. mod. in tension 80° C., cond. | MPa | 7,000 | 7,750 | 7,500 | 7,000 | 6,000 |
| | E. mod. in tension 100° C., cond. | MPa | 6,000 | 6,500 | 6,000 | 6,250 | 4,750 |
| | Breaking stress 23° C., dry | MPa | 225 | 225 | 200 | 225 | 170 |
| | Breaking stress 80° C., dry | MPa | 135 | 135 | 125 | 150 | 105 |
| | Breaking stress 100° C., dry | MPa | 120 | 120 | 115 | 130 | 95 |
| | Breaking stress 23° C., cond. | MPa | 165 | 185 | 175 | 165 | 150 |
| | Breaking stress 80° C., cond. | MPa | 95 | 105 | 100 | 95 | 85 |
| | Breaking stress 100° C., cond. | MPa | 85 | 95 | 90 | 85 | 75 |
| | Breaking elongation 23° C., dry | % | 2.7 | 2.9 | 3.0 | 2.4 | 4.5 |
| | Breaking elongation 80° C., dry | % | 5.6 | 5.9 | 5.3 | 3.7 | 8.5 |
| | Breaking elongation 100° C., dry | % | 6.7 | 7.2 | 5.9 | 4.6 | 9.8 |
| | Breaking elongation 23° C., cond. | % | 3.8 | 3.2 | 3.2 | 3.3 | 4.7 |
| | Breaking elongation 80° C., cond. | % | 4.8 | 5.3 | 4.6 | 4.8 | 9.3 |
| | Breaking elongation 100° C., cond. | % | 6.3 | 7.2 | 6.1 | 4.9 | 10.4 |
| | HDT A (1.8 MPa), dry | ° C. | 240 | 205 | 185 | 280 | 170 |
| | HDT C (8 MPa), dry | ° C. | 105 | 155 | 150 | 205 | 135 |
| | Water absorption, 336 h, 95° C. in water | % by wt. | 3.77 | 2.15 | 1.64 | 4.71 | 1.34 |

TABLE 3

(Comparative examples)

| | Components | Unit | CE1 | CE2 | CE3 | CE4 | CE5 |
|---|---|---|---|---|---|---|---|
| I | PA 66 | % by wt. | 37.75 | 37.75 | 37.75 | 37.75 | 49.75 |
| (A) | PA 6 | % by wt. | | | | | |
| | PA 610 | % by wt. | | | | | |
| | PA 1010 | % by wt. | | | | | |
| | PA 46 | % by wt. | | | | | |
| | PA 12 | % by wt. | | | | | |
| I | PA 1 | % by wt. | | | | | |
| (B) | PA 2 | % by wt. | 12 | | | | |
| | PA 3 | % by wt. | | 12 | | | |
| | PA 4 | % by wt. | | | 12 | | |
| | PA 5 | % by wt. | | | | 12 | |
| II | Glass fibres | % by wt. | 50 | 50 | 50 | 50 | 50 |
| V | Stabiliser | % by wt. | 0.25 | 0.25 | 0.25 | 0.25 | 0.25 |
| E. mod. in tension 23° C., dry | | MPa | 15,500 | 16,250 | 15,250 | 15,500 | 15,750 |
| E. mod. in tension 80° C., dry | | MPa | 8,250 | 8,750 | 8,500 | 7,750 | 8,000 |
| E. mod. in tension 100° C., dry | | MPa | 5,750 | 7,750 | 6,750 | n.d. | n.d. |
| E. mod. in tension 23° C., cond. | | MPa | 14,500 | 14,500 | 14,750 | 15,250 | 12,750 |
| E. mod. in tension 80° C., cond. | | MPa | 6,250 | 6,750 | 6,750 | n.d. | 6,750 |
| E. mod. in tension 100° C., cond. | | MPa | 4,250 | 5,000 | 5,000 | n.d. | n.d. |
| Breaking stress 23° C., dry | | MPa | 225 | 230 | 220 | 210 | 225 |
| Breaking stress 80° C., dry | | MPa | 125 | 130 | 130 | 125 | 145 |
| Breaking stress 100° C., dry | | MPa | 105 | 120 | 120 | n.d. | n.d. |
| Breaking stress 23° C., cond. | | MPa | 165 | 175 | 180 | 180 | 165 |
| Breaking stress 80° C., cond. | | MPa | 75 | 95 | 100 | n.d. | 100 |
| Breaking stress 100° C., cond. | | MPa | 70 | 85 | 80 | n.d. | n.d. |
| Breaking elongation 23° C., dry | | % | 2.8 | 2.4 | 2.8 | 2.6 | 2.9 |
| Breaking elongation 80° C., dry | | % | 6.4 | 5.3 | 6.2 | 6.5 | 5.4 |
| Breaking elongation 100° C., dry | | % | n.d. | 6.6 | 7.4 | n.d. | n.d. |
| Breaking elongation 23° C., cond. | | % | 3.3 | 3.5 | 3.2 | 3.4 | 4.0 |
| Breaking elongation 80° C., cond. | | % | 7.4 | 6.5 | 6.9 | n.d. | 5.1 |
| Breaking elongation 100° C., cond. | | % | n.d. | 7.0 | 7.4 | n.d. | n.d. |
| HDT A (1.8 MPa), dry | | ° C. | 230 | 235 | 235 | 230 | 240 |
| HDT C (8 MPa), dry | | ° C. | 145 | 180 | 160 | 140 | 200 |
| Water absorption, 336 h, 95° C. in water | | % by wt. | 3.74 | 3.61 | 3.7 | n.d. | 4 |

| | |
|---|---|
| Glass fibres | VETROTEX 995 EC 10-4.5, round glass fibres with a diameter of 10 μm and a length of 4.5 mm, Owens Corning |
| Stabiliser | Irganox 1010 (hindered phenol, CAS: 6683-19-8) |

The examples according to the invention comprise the partially crystalline, partially aromatic polyamide PA 6T/BACT/66/BAC6 as partially aromatic, partially crystalline polyamide, which was produced according to the above-indicated method specification. This polyamide corresponds to polyamide (B) of the polyamide mixture which is contained as component (I) in the polyamide moulding compound.

The comparative examples comprise in fact likewise partially aromatic polyamides, however these do not correspond to the polyamides (B) according to the invention.

Surprisingly, it is shown that an increase in the concentration of PA-1 as component (B) (Example E1-E5), with $T_g$=150° C. and $T_m$=325° C., effected a constant improvement in the rigidity up to 100° C., dry and conditioned, and continuously reduced the water absorption relative to pure PA 66 (CE5). The breaking elongation at 23° C. thereby decreased only slightly. Even higher concentrations of component (B) would however then impair the processability and further increase the brittleness. Different amorphous polyamides as component (B) (CE1, CE3 and CE4) with a $T_g$ of 125-160° C. showed here, if at all, only slight improvements in the rigidity or water absorption. Likewise, improvements could scarcely be established in CE2 with a partially aromatic, partially crystalline polyamide ($T_g$=135° C. and $T_m$=325° C.).

Examples E6-E10 show that PA-1 as component (B) is also compatible with numerous other partially crystalline, aliphatic polyamides, and improves the rigidity up to 100° C., dry and conditioned, with extensive maintenance of the breaking elongation at 23° C. Furthermore, in particular in the case of short-chain aliphatic polyamides (E9), the water absorption is reduced significantly.

The invention claimed is:

1. A polyamide moulding compound comprising:
   (I) 40 to 100% by weight of a mixture made of
     (A) 68 to 88% by weight of at least one partially crystalline, aliphatic polyamide and
     (B) 12 to 32% by weight of at least one partially crystalline, partially aromatic polyamide, formed from a diamine component (Ba), a dicarboxylic acid component (Bb), and optionally a lactam- and/or ω-amino acid component (Bc), wherein the diamine component (Ba) is present essentially in equimolar amount to the dicarboxylic acid component (Bb), the quantity of lactam- and/or ω-amino acid component (Bc) is 0 to 15% by mol, and the sum of components (Ba) to (Bc) is 100% by mol, wherein the diamine component (Ba) consists of
       (Ba1) 62 to 96 mol-parts of 1,6-hexanediamine,
       (Ba2) 4 to 38 mol-parts of bis(aminomethyl)cyclohexane, and
       (Ba3) 0 to 30 mol-parts of one or more cycloaliphatic diamines, different from (Ba2), wherein the sum of (Ba2) and (Ba3) is 4 to 38 mol-parts and the sum of (Ba1), (Ba2) and (Ba3) is 100 mol-parts, the dicarboxylic acid component (Bb) consists of
(Bb1) 64 to 100 mol-parts of terephthalic acid,
(Bb2) 0 to 18 mol-parts of isophthalic acid, and
(Bb3) 0 to 18 mol-parts of one or more aliphatic dicarboxylic acids with 6 to 18 C atoms, wherein the sum of (Bb1), (Bb2) and (Bb3) is 100 mol-parts, and the lactam- and/or ω-amino acid component (Bc) consists of one or more lactams and/or ω-amino acids, wherein the sum of the lactams and/or ω-amino acids is 100 mol-parts, and the proportions of (A) and (B) are related to the sum of the polyamides (A) and (B) and constitute in total 100% by weight of the mixture, (II) 0-60% by weight of fibrous reinforcing materials;
(III) 0-30% by weight of particulate fillers, different from (II) and (IV) to (VI);
(IV) 0-20% by weight of impact modifiers;
(V) 0-2.0% by weight of heat stabilisers;
(VI) 0-6% by weight of auxiliary materials and/or additives different from (II)-(V);

the sum of components (I)-(VI) constituting 100% by weight of the polyamide moulding compound.

2. The polyamide moulding compound according to claim 1, wherein the at least one partially crystalline, aliphatic polyamide (A) is selected from the group consisting of polyamide 46, polyamide 6, polyamide 56, polyamide 66, polyamide 11, polyamide 12, polyamide 1212, polyamide 1010, polyamide 1012, polyamide 1112, polyamide 610, polyamide 106, polyamide 612, polyamide 614, polyamide 616, polyamide 516, polyamide 618, polyamide 69, polyamide 810, copolyamides thereof, and mixtures, blends or alloys thereof.

3. The polyamide moulding compound according to claim 1, wherein the mixture (I) comprises
(A) 68 to 85% by weight of the at least one partially crystalline, aliphatic polyamide and
(B) 15 to 32% by weight of the at least one partially crystalline, partially aromatic polyamide.

4. The polyamide moulding compound according to claim 1, wherein the at least one partially crystalline, aliphatic polyamide (A) has a solution viscosity $\eta_{rel}$, measured in m-cresol (0.5 g polymer in 100 ml m-cresol, 20° C.) in the range of 1.5 to 3.0.

5. The polyamide moulding compound according to claim 1, wherein the diamine component (Ba) is selected from
(Ba1) 65 to 90 mol-parts of 1,6-hexanediamine,
(Ba2) 10 to 35 mol-parts of bis(aminomethyl)cyclohexane, and
(Ba3) 0 to 25 mol-parts of one or more cycloaliphatic diamines, different from (Ba2), wherein
the sum of (Ba2) and (Ba3) is 10 to 35 mol-parts and the sum of (Ba1), (Ba2), and (Ba3) is 100 mol-parts.

6. The polyamide moulding compound according to claim 1, wherein the diamine component (Ba) is selected from
(Ba1) 70 to 82 mol-parts of 1,6-hexanediamine,
(Ba2) 18 to 30 mol-parts of bis(aminomethyl)cyclohexane, and
(Ba3) 0 to 12 mol-parts of one or more cycloaliphatic diamines which are different from (Ba2), wherein
the sum of (Ba2) and (Ba3) is 18 to 30 mol-parts and the sum of (Ba1), (Ba2), and (Ba3) is 100 mol-parts.

7. The polyamide moulding compound according to claim 1, wherein the dicarboxylic acid component (Bb) is selected from
(Bb1) 70 to 100 mol-parts of terephthalic acid,
(Bb2) 0 to 15 mol-parts of isophthalic acid, and
(Bb3) 0 to 15 mol-parts of one or more aliphatic dicarboxylic acids with 6 to 18 C atoms, wherein
the sum of (Bb1), (Bb2), and (Bb3) is 100 mol-parts.

8. The polyamide moulding compound according to claim 1, wherein the dicarboxylic acid component (Bb) is selected from
(Bb1) 80 to 100 mol-parts of terephthalic acid,
(Bb2) 0 to 10 mol-parts of isophthalic acid, and
(Bb3) 0 to 10 mol-parts of one or more aliphatic dicarboxylic acids with 6 to 18 C atoms, wherein
the sum of the (Bb1), (Bb2), and (Bb3) is 100 mol-parts.

9. The polyamide moulding compound according to claim 1, wherein the quantity of the lactam- and/or ω-amino acid component (Bc) is 0 to 10% by mol.

10. The polyamide moulding compound according to claim 1, wherein the sum of the mol-parts of (Ba2) bis(aminomethyl)cyclohexane, (Ba3) cycloaliphatic diamine, (Bb2) isophthalic acid, and (Bb3) aliphatic dicarboxylic acid is at most 38 mol-parts.

11. The polyamide moulding compound according to claim 1, wherein:
the diamine component (Ba) is selected from
(Ba1) 65 to 85 mol-parts of 1,6-hexanediamine and
(Ba2) 15 to 35 mol-parts of bis(aminomethyl)cyclohexane, and
the sum of (Ba1) and (Ba2) is 100 mol-parts and/or
the dicarboxylic acid component (Bb) is selected from
(Bb1) 80 to 100 mol-parts of terephthalic acid and
(Bb3) 0 to 20 mol-parts of one or more aliphatic dicarboxylic acids with 6 to 18 C atoms, and
the sum of (Bb1) and (Bb3) being 100 mol-parts.

12. The polyamide moulding compound according to claim 1, wherein the at least one partially crystalline, partially aromatic polyamide (B) has
a glass transition temperature of at least 140° C.,
a melting temperature of at most 340° C.,
a modulus of elasticity between 2,400 and 4,200 MPa, and/or
a relative viscosity, measured at 20° C. and a concentration of 0.5 g/dl in m-cresol, of 1.45 to 1.95.

13. The polyamide moulding compound according to claim 1, wherein the content of the components, independently of each other, is
(I) from 40 to 84.9% by weight,
(II) from 15 to 60% by weight,
(III) from 0 to 20% by weight,
(IV) 0% by weight or between 5 and 15% by weight,
(V) from 0.1 to 2.0% by weight, and/or
(VI) from 0.1 to 6.0% by weight.

14. A moulded article produced from a polyamide moulding compound according to claim 1.

15. The moulded article according to claim 14, which is a component in an automobile, in a hot water appliance, in a coffee machine, electric kettle, immersion coil, dishwasher, or washing machine, in measuring, regulating and control technology, or in compressed air controls or valves, or in mechanical engineering.

* * * * *